US012745745B2

(12) United States Patent
Morand et al.

(10) Patent No.: US 12,745,745 B2
(45) Date of Patent: Sep. 29, 2026

(54) PORTABLE LITTER BOX AND METHOD OF USE

(71) Applicant: ANGELCARE CANADA INC., Montreal (CA)

(72) Inventors: Michel Morand, Montréal (CA); Hugo Moerman-Rousseau, St-Hubert (CA)

(73) Assignee: ANGELCARE CANADA INC., Montreal (CA)

( * ) Notice: Subject to any disclaimer, the term of this patent is extended or adjusted under 35 U.S.C. 154(b) by 35 days.

(21) Appl. No.: 18/388,557

(22) Filed: Nov. 10, 2023

(65) Prior Publication Data

US 2024/0074402 A1 Mar. 7, 2024

Related U.S. Application Data

(63) Continuation of application No. 16/628,783, filed as application No. PCT/CA2018/050828 on Jul. 6, 2018, now Pat. No. 11,819,007.

(60) Provisional application No. 62/529,211, filed on Jul. 6, 2017.

(51) Int. Cl.
*A01K 1/01* (2006.01)
*B65D 5/468* (2006.01)

(52) U.S. Cl.
CPC .......... *A01K 1/0107* (2013.01); *B65D 5/4608* (2013.01)

(58) Field of Classification Search
CPC .................................................... A01K 1/0107
See application file for complete search history.

(56) References Cited

U.S. PATENT DOCUMENTS

| | | | | | |
|---|---|---|---|---|---|
| 648,444 | A | | 5/1900 | Soerensen | |
| 2,469,784 | A | | 5/1949 | William | |
| 3,744,453 | A | * | 7/1973 | Deitch | A01K 23/005 294/1.5 |
| 4,047,499 | A | * | 9/1977 | Janecek | A01K 1/0107 119/168 |
| 4,706,606 | A | * | 11/1987 | Coppola | A01K 1/0107 119/165 |

(Continued)

FOREIGN PATENT DOCUMENTS

| | | | | | |
|---|---|---|---|---|---|
| DE | 10239348 | A1 | * | 10/2003 | A61B 10/007 |
| WO | 0111947 | | | 2/2001 | |
| WO | 2016025823 | A1 | | 2/2016 | |

OTHER PUBLICATIONS

European Search Report for corresponding application EP23211327: Mail date Mar. 5, 2024.

(Continued)

*Primary Examiner* — Magdalena Topolski
(74) *Attorney, Agent, or Firm* — CANTOR COLBURN LLP

(57) ABSTRACT

A litter box comprises a body made of at least one flexible elastomeric material, the body having a wall defining a cavity with a top open end. The wall has four generally upstanding wall portions contouring the cavity. A first wall portion has a first minimum height of 8.0 inches or less, a second wall portion having a second minimum height of 10.0 inches or more and being opposite the first wall portion. Third and fourth wall portions are higher than the first minimum height and the second minimum height, the third and fourth wall portions being on opposite sides of one another and being located between the first wall portion and the second wall portion.

15 Claims, 5 Drawing Sheets

(56) References Cited

U.S. PATENT DOCUMENTS

| | | | | | |
|---|---|---|---|---|---|
| 4,782,788 | A | | 11/1988 | Arcand | |
| 4,802,442 | A | * | 2/1989 | Wilson | A01K 1/0114 119/166 |
| 4,970,987 | A | * | 11/1990 | Deyle | A01K 1/0114 209/374 |
| 5,094,188 | A | | 3/1992 | Wolak | |
| 5,144,914 | A | * | 9/1992 | Giannakopoulos | A01K 1/0107 119/168 |
| 5,199,571 | A | | 4/1993 | Wolff et al. | |
| 5,329,878 | A | | 7/1994 | Mccauley | |
| 5,488,929 | A | * | 2/1996 | Pierson | A01K 1/0125 119/170 |
| D374,321 | S | | 10/1996 | Tomblin et al. | |
| 5,690,051 | A | | 11/1997 | Fisher et al. | |
| 5,794,566 | A | * | 8/1998 | Goetz | A01K 1/0107 119/161 |
| 5,816,195 | A | * | 10/1998 | Flynn | A01K 1/0107 119/165 |
| 5,887,546 | A | | 3/1999 | Gruel | |
| D412,228 | S | | 7/1999 | Diehl | |
| 6,354,243 | B1 | | 3/2002 | Lewis, II et al. | |
| 6,382,131 | B1 | * | 5/2002 | McGivern | A01K 1/0125 119/168 |
| D462,491 | S | | 9/2002 | Hauenstein | |
| D526,748 | S | | 8/2006 | Van | |
| D638,590 | S | | 5/2011 | Lipscomb et al. | |
| D704,432 | S | | 5/2014 | Askaroff | |
| 10,524,447 | B1 | * | 1/2020 | Tayebi | A01K 1/0125 |
| 2006/0042551 | A1 | | 3/2006 | Moran | |
| 2009/0110335 | A1 | | 4/2009 | Leboeuf | |
| 2009/0133637 | A1 | | 5/2009 | Petersen | |
| 2009/0241851 | A1 | * | 10/2009 | Peddycoart | A01K 1/0107 119/168 |
| 2014/0053785 | A1 | | 2/2014 | Christianson et al. | |
| 2017/0127643 | A1 | | 5/2017 | Waddell | |

OTHER PUBLICATIONS

European Search Report for corresponding application EP 18827614: Report Date Jun. 9, 2020.

https://www.ptonline.com/articles/density-molecular-weight-inpolyethylene (Year: 2012).

International Search Report for corresponding application PCT/CA2018/050828 filed Jul. 6, 2018; Mail date Sep. 21, 2018.

Written Opinion for corresponding application PCT/CA2018/050828 filed Jul. 6, 2018; Mail date Sep. 21, 2018.

* cited by examiner

PORTABLE LITTER BOX AND METHOD OF USE

CROSS-REFERENCE TO RELATED APPLICATION

The present application is a continuation of U.S. patent application Ser. No. 16/628,783, filed on Jul. 6, 2018, which claims the priority of U.S. Patent Application No. 62/529,211, filed on Jul. 6, 2017 and incorporated herein by reference.

TECHNICAL FIELD

The present application generally relates to litter boxes.

BACKGROUND OF THE ART

Litter boxes and their immediate environment may not always be neat. In particular, litter boxes tend to have relatively low edges, resulting in the litter spilling out of the litter box. To overcome this issue, some litter boxes are equipped with hoods, making them bulky. Moreover, litter boxes are conventionally made of rigid plastic, which makes their maneuvering quite hard, especially in a case in which the litter must be disposed of. It is therefore an aim of the present disclosure to address issues related to the prior art.

SUMMARY

It is an aim of the present disclosure to provide a novel litter box.

Therefore, in accordance with a first embodiment of the present disclosure, there is provided a litter box comprising a body made of at least one flexible elastomeric material, the body having a wall defining a cavity with a top open end, the wall having a first minimum height of 8.0 inches or less on a first side, the wall having a second minimum height of 10.0 inches or more on a second side opposite the first side, handles being provided on opposite sides located between the first side and the second side.

Further in accordance with first embodiment, the body defines for instance a pair of flaps between and extending higher than the first side and the second side.

Still further in accordance with first embodiment, the handles are for instance defined by a handle hole in each of the flaps.

Still further in accordance with first embodiment, an eyelet forms for instance a periphery of each of the handle hole.

Still further in accordance with first embodiment, the eyelet is for instance made of a material different than a material of the body, the eyelet being molded to the body.

Still further in accordance with first embodiment, the eyelet is for instance defined by a thickening of a material of the body relative a surface of the wall surrounding the eyelet.

Still further in accordance with first embodiment, the top open end of the cavity is for instance delimited by a peripheral edge.

Still further in accordance with first embodiment, the peripheral edge is for instance arcuate without a vertex.

Still further in accordance with first embodiment, at least one spout is for instance defined in the peripheral edge.

Still further in accordance with first embodiment, the spout is for instance in the second side at a location of the second minimum height.

Still further in accordance with first embodiment, the cavity is for instance defined by an inner surface of the body, the inner surface being edgeless from the peripheral edge into the cavity.

Still further in accordance with first embodiment, the litter box flares for instance from a bottom to the top open end.

Still further in accordance with first embodiment, the second minimum height is for instance between 25% to 60% higher than the first minimum height.

Still further in accordance with first embodiment, the body is for instance molded polyethylene.

Still further in accordance with first embodiment, a thickness of the molded polyethylene is for instance between 60 and 90 mils.

Still further in accordance with first embodiment, a thickness of the molded polyethylene is for instance between 70 and 80 mils.

Still further in accordance with first embodiment, a relative density of the molded polyethylene ranges for instance between 0.85 to 0.98 in comparison to that of water.

In accordance with a second embodiment of the present disclosure, there is provided a litter box comprising a body made of at least one flexible elastomeric material, the body having a wall defining a cavity with a top open end, the wall having four generally upstanding wall portions contouring the cavity, a first wall portion having a first minimum height of 8.0 inches or less, a second wall portion having a second minimum height of 10.0 inches or more and being opposite the first wall portion, third and fourth wall portions being higher than the first minimum height and the second minimum height, the third and fourth wall portions being on opposite sides of one another and being located between the first wall portion and the second wall portion.

Further in accordance with second embodiment, the third and fourth wall portions each define for instance a flap.

Still further in accordance with second embodiment, handles are defined for instance by a handle hole in each of the flaps.

Still further in accordance with second embodiment, an eyelet forms for instance a periphery of each of the handle hole.

Still further in accordance with second embodiment, the eyelet is for instance made of a material different than a material of the body, the eyelet being molded to the body.

Still further in accordance with second embodiment, the eyelet is defined for instance by a thickening of a material of the body relative a surface of the wall surrounding the eyelet.

Still further in accordance with second embodiment, the top open end of the cavity is for instance delimited by a peripheral edge.

Still further in accordance with second embodiment, the peripheral edge is for instance arcuate without a vertex. for instance Still further in accordance with second embodiment, at least one spout is for instance defined in the peripheral edge.

Still further in accordance with second embodiment, the spout is for instance in the second wall portion at a location of the second minimum height.

Still further in accordance with second embodiment, the cavity is for instance defined by an inner surface of the body, the inner surface being edgeless from the peripheral edge into the cavity.

Still further in accordance with second embodiment, the litter box flares for instance from a bottom to the top open end.

Still further in accordance with second embodiment, the second minimum height is for instance between 25% to 60% higher than the first minimum height.

Still further in accordance with second embodiment, the body is molded for instance polyethylene.

Still further in accordance with second embodiment, a thickness of the molded polyethylene is for instance between 60 and 90 mils.

Still further in accordance with second embodiment, a thickness of the molded polyethylene is for instance between 70 and 80 mils.

Still further in accordance with second embodiment, a relative density of the molded polyethylene ranges for instance between 0.85 to 0.98 in comparison to that of water.

In accordance with a third embodiment of the present disclosure, there is provided a litter box comprising a body having a wall defining a cavity with a top open end, the wall having four generally upstanding wall portions contouring the cavity, a first wall portion, a second wall portion being opposite the first wall portion, third and fourth wall portions being on opposite sides of one another and being located between the first wall portion and the second wall portion, the third and fourth wall portions each defining a flap extending higher than the first wall portion and the second wall portion, handles being defined by a handle hole in each of the flaps, wherein the body is made of at least one flexible elastomeric material, the body being molded into open ended molded shape, the body being deformable in an elastic deformation range wherein the flaps are brought into contact with one another, the body providing a biasing force back to its open ended molded shape.

Further in accordance with third embodiment, an eyelet forms for instance a periphery of each of the handle hole.

Still further in accordance with third embodiment, the eyelet is for instance made of a material different than a material of the body, the eyelet being molded to the body.

Still further in accordance with third embodiment, the eyelet is for instance defined by a thickening of a material of the body relative a surface of the wall surrounding the eyelet.

Still further in accordance with third embodiment, the top open end of the cavity is for instance delimited by a peripheral edge.

Still further in accordance with third embodiment, the peripheral edge is for instance arcuate without a vertex.

Still further in accordance with third embodiment, at least one spout is for instance defined in the peripheral edge.

Still further in accordance with third embodiment, the cavity is for instance defined by an inner surface of the body, the inner surface being edgeless from the peripheral edge into the cavity.

Still further in accordance with third embodiment, the litter box flares for instance from a bottom to the top open end in the open ended molded shape.

Still further in accordance with third embodiment, the body is for instance molded polyethylene.

Still further in accordance with third embodiment, a thickness of the molded polyethylene is for instance between 60 and 90 mils.

Still further in accordance with third embodiment, a thickness of the molded polyethylene is for instance between 70 and 80 mils.

Still further in accordance with third embodiment, a relative density of the molded polyethylene ranges for instance between 0.85 to 0.98 in comparison to that of water.

Still further in accordance with third embodiment, the first wall portion has for instance a first minimum height of 8.0 inches or less, the second wall portion having a second minimum height of 10.0 inches.

Still further in accordance with third embodiment, the second minimum height is for instance between 25% to 60% higher than the first minimum height.

DETAILED DESCRIPTION

Figure 1:
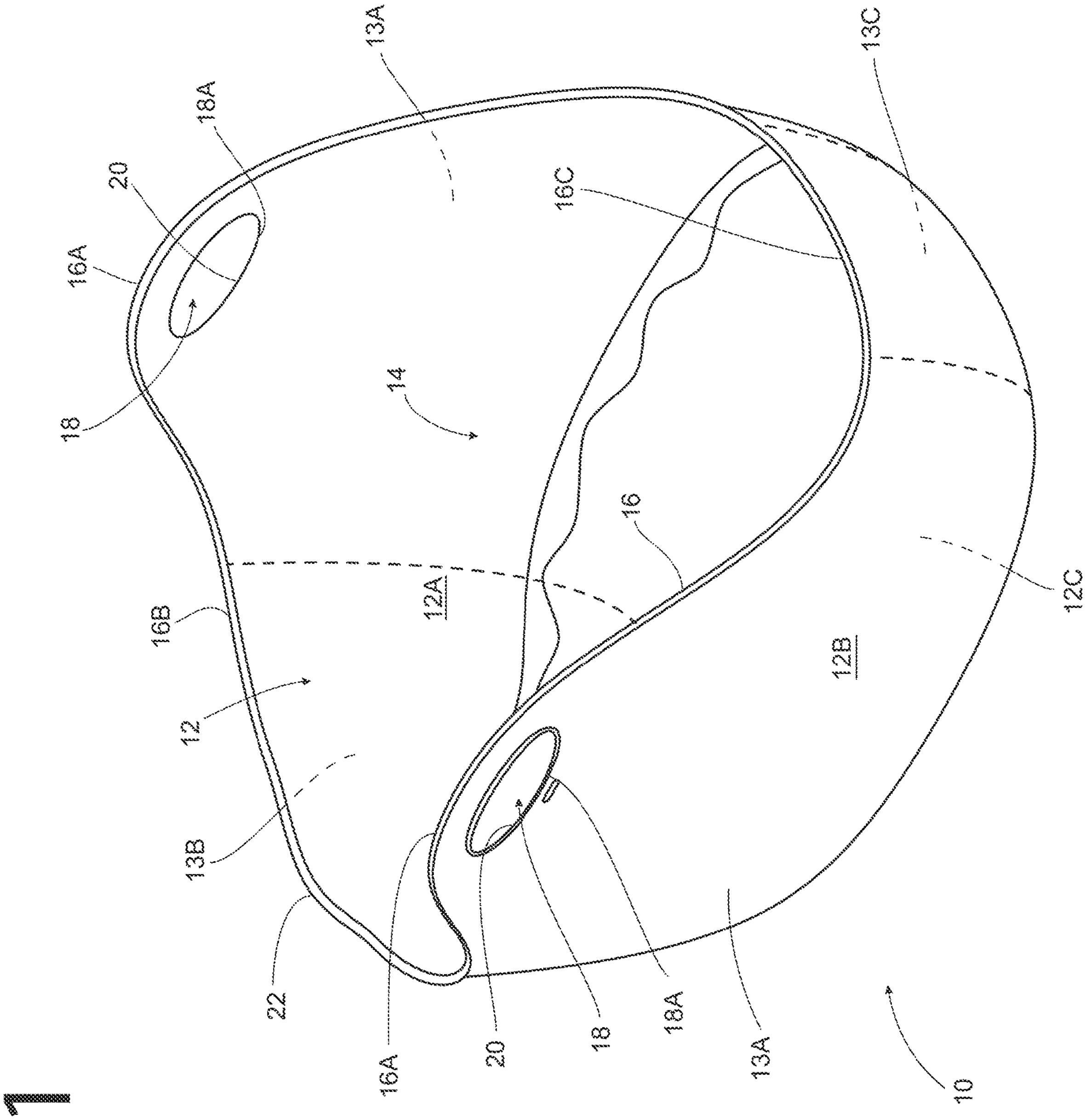
FIG. 1 is a perspective view of a litter box in accordance with the present disclosure, as filled with litter.

Referring to the drawings, and more particularly to FIG. 1, a litter box in accordance with the present disclosure is generally shown at 10. The expression "box" is used herein as it is the commonly used expression to designate the recipient or receptacle designed to accommodate litter, to collect feces and urine from a pet (typically a cat or cats). Other expressions could be used, such as litter tray, pan, etc. Moreover, the expression "box" is not limited to known box shapes such as square or rectangular, nor does the expression "box" entail that a cover may be present, though a cover could be provided as an accessory in an embodiment.

Figure 2:
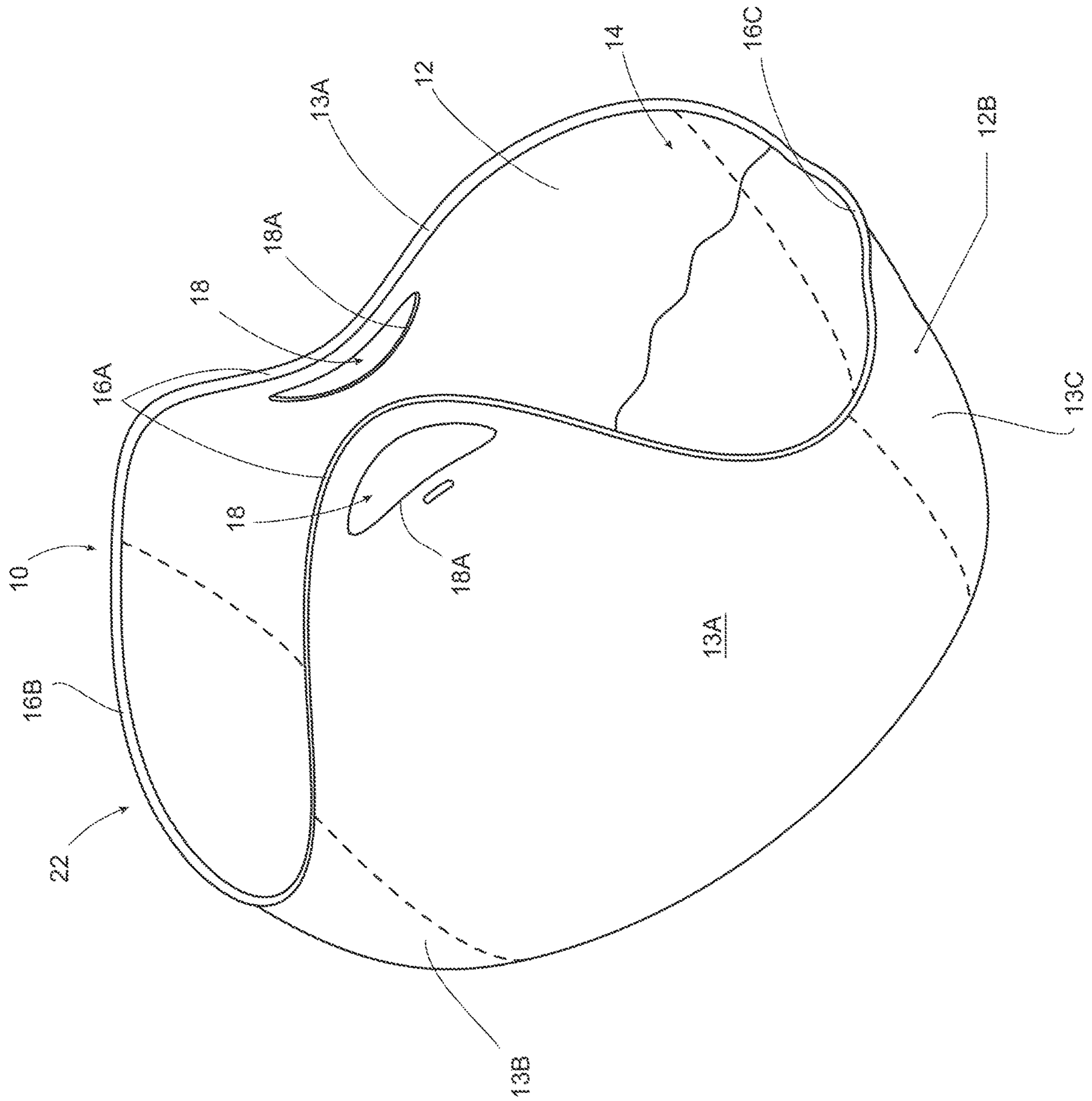
FIG. 2 is a perspective view of the litter box of FIG. 1, as it deforms while handled to be emptied of soiled litter.

The litter box 10 of the present disclosure is made of a wall 12 molded into the shape of FIG. 1, referred to as open ended molded shape, or other shapes. Accordingly, the litter box 10 may have a body defined by a single continuous wall 12 resulting from an injection molding process, with or without overmolding with other pieces. For example, in another embodiment, the body of the litter box 10 may consist of an assembly of different walls into the shape of FIG. 1. According to an embodiment, the wall 12 consists of polyethylene, molded at a thickness of ranging between 60 and 90 mils, and more particularly between 70-80 mils. The litter box 10 may thus be of monolithic construction. The polyethylene may have a relative density ranging between 0.85 to 0.98 in comparison to that of water. This is an example among a few other materials that may be used, as materials such as rubbers and other elastomers such as polypropylene could be used as well. In selecting a material for the litter box 10, the selection must be such that the litter box 10 is tear-resistant in spite of the weight of the litter with feces and urine clusters therein. This may or may not include reinforcement materials, for instance using overmolding or other techniques to add reinforcement materials. Such reinforcement materials may be at the handles as described hereinafter. The material must also be capable of elastically deforming for the litter box 10 to be carried, for example in the manner shown in FIG. 2. In an embodiment, the deformation from FIG. 1 to FIG. 2, and back to FIG. 1, is in entirely in the elastic deformation range. The elastic deformation allows the litter box 10 to generally regain the shape of FIG. 1, when not being handled in the manner shown in FIG. 2. Other names for this property include flexibility, compliance, resilience, etc. It also allows the litter box 10 to be stowed in tight volumes, by deformation of upper parts of the litter box 10. The material therefore is deformable, a.k.a., non-rigid, though it may not be substantially stretchable. The material has a sufficient thickness to have structural integrity, i.e., it retains the shape of FIG. 1 when not manipulated or in contact with environing objects. Moreover, the material may be waterproof, to retain liquids in the litter box 10.

The litter box 10 has an inner surface 12A, in the concave side of the wall 12, and an outer surface 12B, in the convex side of the wall 12. A part of the outer surface 12B may form a bottom surface 12C, upon which the litter box 10 lies when standing upright in the manner shown in FIG. 1. The bottom surface 12C may therefore be generally planar. The elastic deformation properties of the litter box 10 may allow the bottom surface 12C to conform to non-planar surfaces. Surface projections may also be formed in the bottom surface 12C, such as a plurality of side-by-side elongated ribs, among other possibilities. Such elongated ribs may define channels with the ground, to allow air circulation.

The generally upright portion of the wall 12 may have four different wall portions, two of which are illustrated as 13A and face each other, another one being 13B and yet another being 13C. Wall portions 13B and 13C face each other. The wall portions 13A (both), 13B, and 13C concurrently form the peripheral portion of the wall 12. The litter box 10 therefore defines an open-ended cavity 14, an opening of which faces upwardly when the litter box 10 is on the ground. A top peripheral edge 16 of the wall 12 delimits the cavity 14. The top peripheral edge 16 may have different segments, such as a pair of handle segments 16A aligned with the wall portions 13A, a rear segment 16B aligned with the wall portion 13B, and a lower segment 16C aligned with the wall portion 13C. In the illustrated embodiment, the pair of handle segments 16A project upwardly from a remainder of the top peripheral edge 16, i.e., from the rear segment 16B and the lower segment 16C. Accordingly, a pair of upwardly oriented flaps or ears is formed, that may allow the handling of the litter box 10 in the manner shown in FIG. 2, while keeping a user's hand(s) at a distance from the litter gathered in the litter box 10, when the litter box 10 is manipulated in the manner shown in FIG. 2. Handle holes 18 may consequently be defined in the flaps of the wall 12, i.e., in the portions aligned with the handle segments 16A, to form integrated handles for the litter box 10. According to an embodiment, the handle holes 18 may be reinforced by the presence of a molded material (e.g., comolded, overmolded), in the form of an eyelet 20, peripherally and inwardly positioned in the handle holes 18. The use of such molding is such that a strong bond is formed between different compatible materials, resulting in an integrally formed component. Stated differently, comolded eyelets 20 may not be removed from the material of the wall 12 without ripping the material of the wall 12 and/or without tools. The eyelet 20 may be made of a material being more rigid than the material of the wall 12, and/or have an increased tear resistance as the material surrounding the handle holes 18 may be exposed to greater stresses. For example, the material of the eyelet 20 may have lesser compliance capacity than the wall 12, as the eyelet 20 does not require an elastic deformation range as large as the material of the wall 12. Materials that may be used for the eyelets 20 include metals, etc. As also observed from FIGS. 1 and 2, the handle holes 18 may define a peripheral flange 18A being a local enlargement of the thickness of the wall 12. The peripheral flange 18A may be part of the eyelet 20 if present, or may simply be a feature of the wall 12. In an embodiment, the eyelet 20 is not made from a different material than the remainder of the wall 12, but has a greater thickness to increase tear resistance. The peripheral flanges 18A define an increased grasping surface in the handles of the litter box 10. In the illustrated embodiment, the litter box 10 has no edge between the inner surface 12A and/or outer surface 12B, other than at the top peripheral edge 16, and at the handle holes 18, due to the presence of continuous arcuate surfaces. It is also observed that the top peripheral edge 16 may be without a vertex. The continuous arcuate surfaces used for the inner surface 12A and the outer surface 12B may facilitate the cleaning of the litter box 10. There may different surface finishes, such as embedded patterns on the outer surface 12B, a litter level line B in the inner surface 12A (e.g., a boundary B between glossy and matte finishes). The glossy part may form the bottom of the open-ended cavity 14, and may have a lower coefficient of friction than the surface above the boundary B, to assist the litter in sliding down to the bottom of the open-ended cavity 14. The glossy part may extend all the way up to a spout. In another embodiment, the surface finish is uniform in and/or out of the litter box 10.

Figure 3:
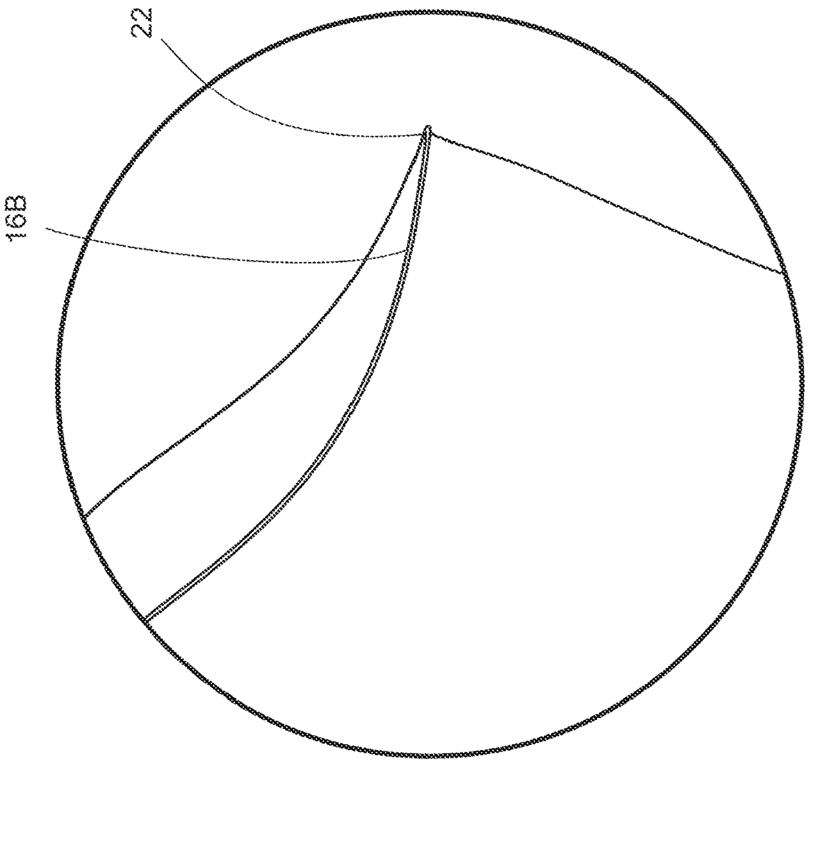
FIG. 3 is an enlarged view of a spout of the litter box of FIG. 1.

Referring to FIG. 3, a spout(s) 22 may also be formed in the rear segment 16B and/or lower segment 16C of the peripheral edge 16. The spout 22 may be an overmolded component, or may be a flange molded as another local enlargement of the material of the wall 12. The spout 22 may project laterally away from the outer surface 12B, and may flare arcuately as shown, so as to guide a "flow" of litter out of the cavity 14 via the spout 22 when "poured" out in the manner shown in FIG. 2. However, it is contemplated to provide the litter box 10 in an embodiment without a projecting spout 22, to rely solely instead on the deformation capacity of the litter box 10 for same to adopt a suitable spout shape in the manner of FIG. 2.

Figure 4:
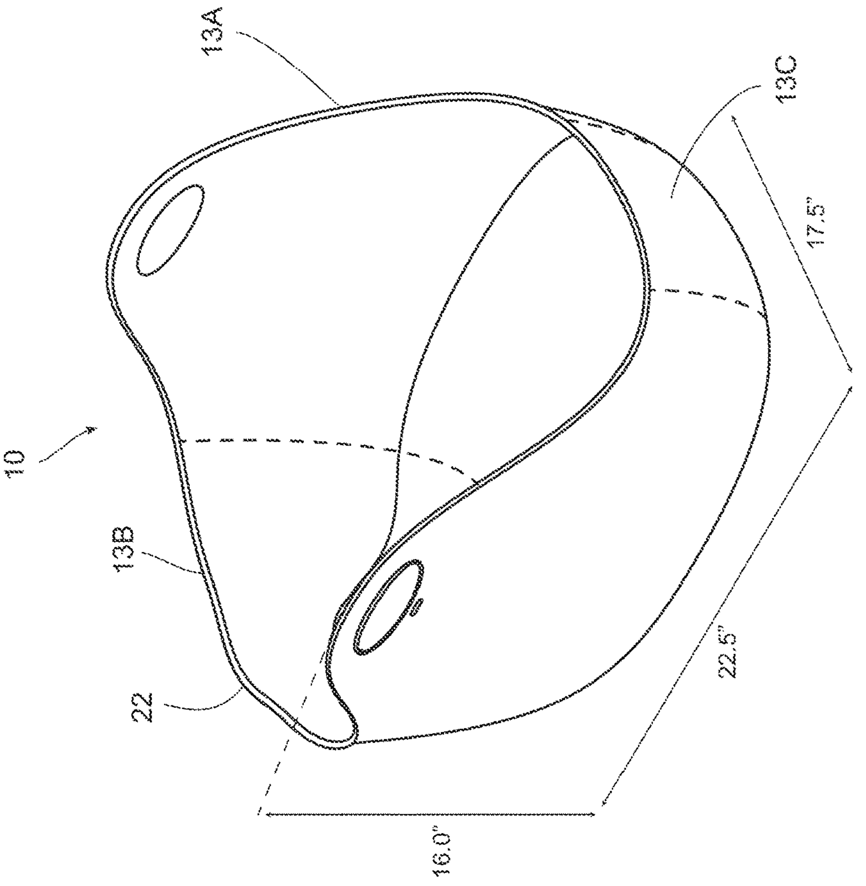
FIG. 4 is a perspective view of the litter box of FIG. 1, with exemplary dimensions.
Figure 5:
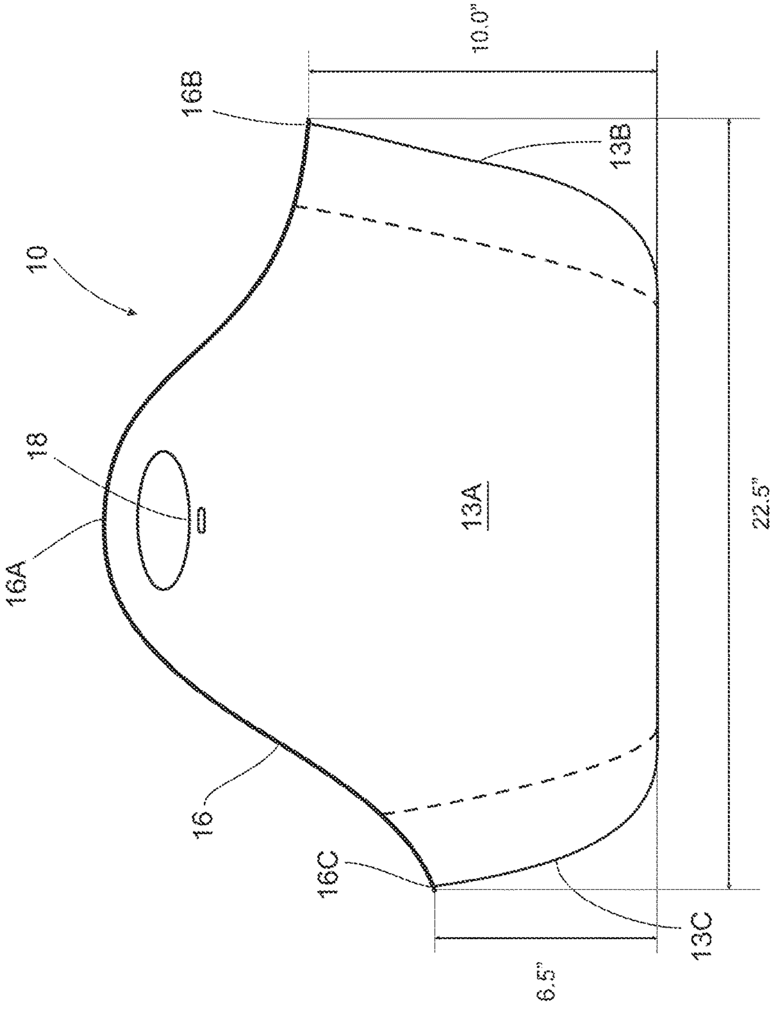
FIG. 5 is a side view of the litter box of FIG. 1, with further exemplary dimensions.

Referring to FIGS. 4 and 5, various dimensions are provided as an example of the size of the litter box 10. These dimensions are provided as a non-limitative illustration, as other dimensions are possible. It is observed that the litter box 10 may be higher at the wall portion 13B than at the wall portion 13C, although this is an option. This may facilitate the entry of the litter box 10 by younger or older cats. Reference to height herein refers to a vertical axis when the litter box 10 is on the ground, as in FIGS. 1 and 4. In both cases, the height of the wall 12 at the wall portions 13B and 13C is such that a barrier is formed to maintain as much of the litter in the litter box 10, in spite of movements of the pet. The pet in the cavity 14 must climb over the wall 12, preventing litter from being dragged out of the litter box 10. The greater height of the wall 12 at wall portion 13B, compared to the height at wall portion 13C, assists in forming the spout 22 closer to the handle holes 18, with a narrower curve than on the opposite side of the litter box 10, for an embodiment with only one spout 22, at the rear segment 16B. The lesser distance between the spout end and the handle formed by the handle holes 18 may indeed facilitate the manipulation of the litter box 10 in "pouring" the litter in the manner shown in FIG. 2.

A male cat in average is about 10.0 inches tall. As observed from the dimensions of FIGS. 4 and 5, the wall portion 13B is higher than 10.0 inches, whereas the wall portion 13C is below 8.0 inches. As cats have a natural tendency to keep a line of sight with their surroundings, cats will naturally oriented themselves to face toward the wall portion 13C, with buttocks facing the wall portion 13B, so as to preserve the line of sight. Once cats are done littering, they have a tendency to bury their feces and urine clusters. Due to the anticipated orientation of the cat, the feces and/or urine clusters are adjacent the higher wall portion 13B, which forms a higher barrier against the burying debris, and against litter scattering. In an embodiment, the lower wall portion 13C is 8 inches or less, 7.5 inches or less, 7.0 inches or less, depending on the average height of the cat type—the height value being determined from the lowest point, and thus regarded as minimum height —, such that the cat may more easily exit or enter the cavity 14. In an embodiment, the higher wall portion 13B is 10.0 inches or more, 10.5 inches or more, 11.0 inches or more, depending for instance on the average height of the cat type, the height value being at the lowest point. Accordingly, the wall portions 13A, having the handles, are higher than the lower wall portion 13C, and than the wall portion 13B. In an embodiment, the lowest point of the higher wall portion 13B is at least 25% higher than the lowest point of the lower wall portion 13C. In an embodiment, the lowest point of the higher wall portion 13B is between 25% to 60% higher than the lowest point of the lower wall portion 13C. The percentage ratio is obtained by dividing the minimum heights by one another.

Figure 6:
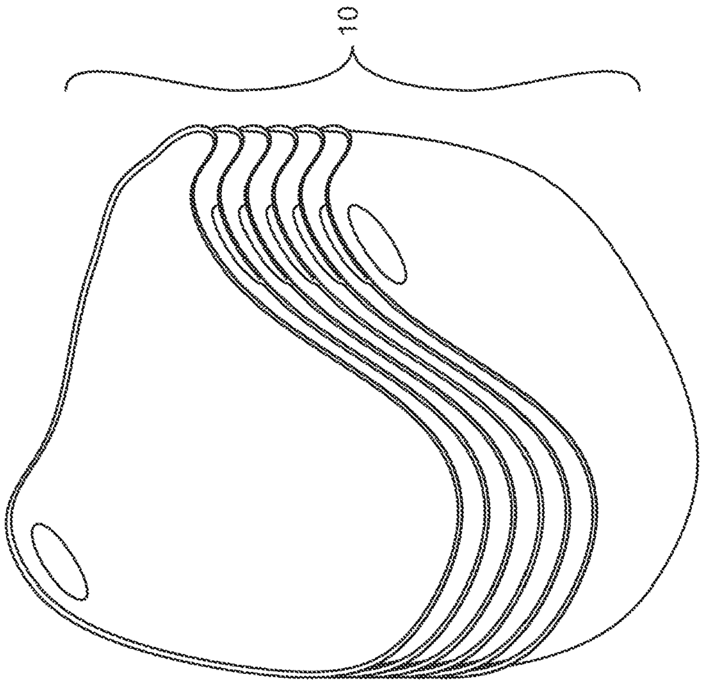
FIG. 6 is a perspective view of a plurality of the litter box of FIG. 1, as stacked.

Referring to FIG. 6, the deformation capacity and the open-end shape of the cavity 14 allows stacking of litter boxes 10 in a compact manner. Litter boxes 10 may be inserted one into another, with a spacing between adjacent litter boxes being a fraction of the overall height of a single litter box 10. Therefore, the transportation and the stocking of the litter boxes 10 are efficient. According to an embodiment, the litter box 10 flares from bottom to top.

Figure 8:
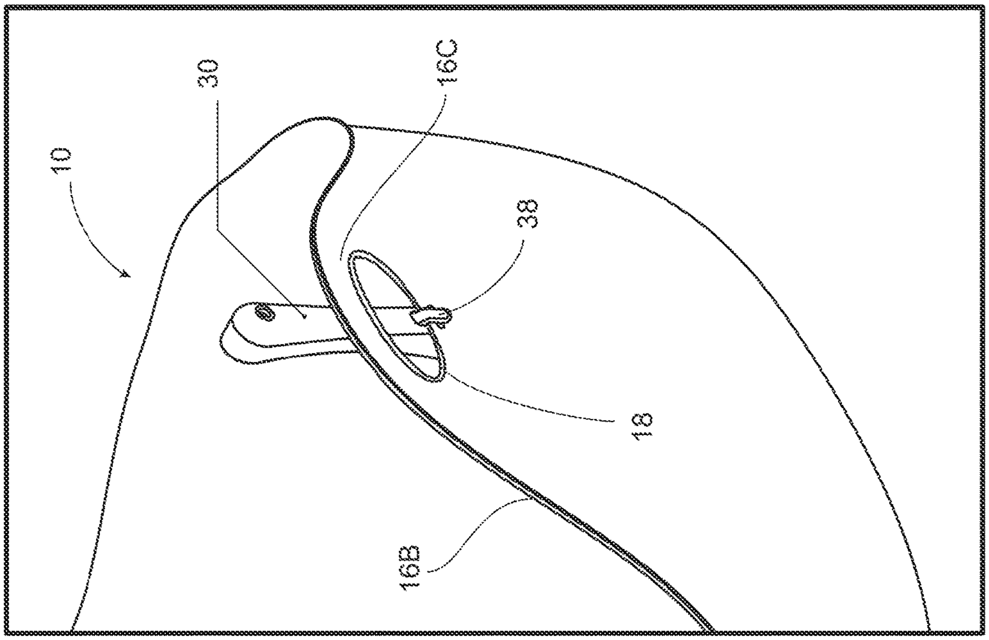
FIG. 8 is a perspective view of the scoop of FIG. 7, as stowed against the litter box of FIG. 1.
Figure 7:
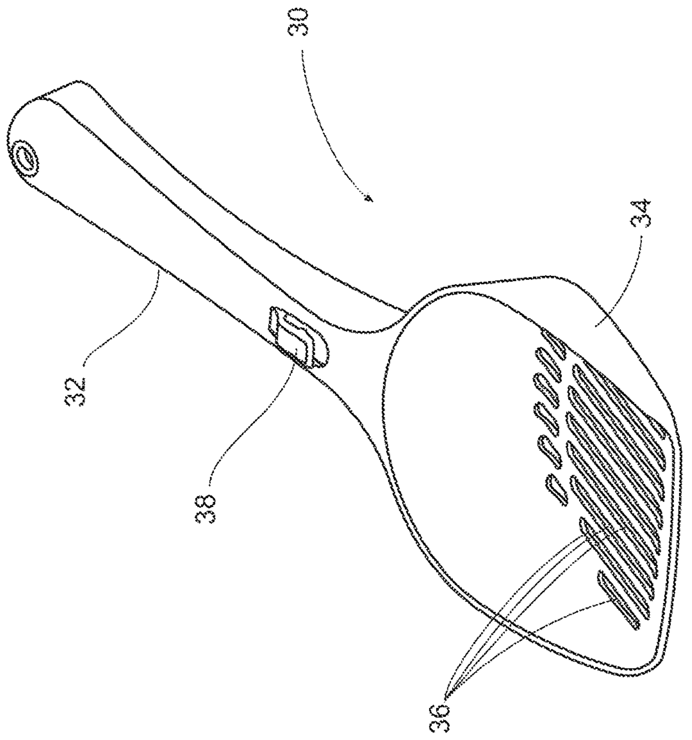
FIG. 7 is a perspective view of a scoop in accordance with another embodiment of the present disclosure.

Referring to FIGS. 7 and 8, a scoop 30 that may be used with the litter box 10. However, the scoop 30 need not be limited to usage with the litter box 10 and vice versa. The scoop 30 has a handle 32 and a bowl portion 34 (a.k.a., bowl, scoop portion). Strainer slots 36 are defined in the bowl portion 34 to allow loose litter to pass through and remain in the litter box 10, while feces and clusters of litter are picked up by the scoop 30. A hook 38 is defined in the handle 32. The hook 38 is sized to receive therein a top end of the wall 12, or like wall, in a stowed condition.

As another embodiment, a hook or loop is provided on the handle 32, for attachment to a hook attached to the litter box 10. In an embodiment, this hook is located at one of the handle holes 18. In an embodiment, a symmetry plane is vertical and passes through a middle of the wall portions 13B and 13C. The minimum heights of the wall portions 13B and 13C may be centrally located and thus may be in the symmetry plane.

According to an embodiment, the litter box 10 has its body made of a flexible elastomeric material. The body is molded into the open ended molded shape of FIG. 1. The body may then be deformed in an elastic deformation range wherein the flaps are brought into contact with one another, as on the verge of occurring in FIG. 2, but with the body providing a biasing force back to its open ended molded shape of FIG. 1.

The invention claimed is:

1. A method for emptying litter and pet waste from a litter box, the litter box having been manually filled with litter to collect pet waste from a pet in the litter box, comprising:
- grasping the litter box by elastically and elastomerically deforming an upright wall of the litter box, the upright wall defining a cavity of the litter box, to bring a pair of flaps of the litter box together from an open ended molded shape, a spout being defined at an edge of the litter box,
- pouring litter with pet waste out of the litter box via the spout during the grasping; and
- allowing the litter box to return to the open ended molded shape.

2. The method according to claim 1, wherein grasping the litter box by bringing a pair of flaps of the litter box together includes grasping the litter box by handles formed into the flaps.

3. The method according to claim 2, wherein grasping the litter box by handles formed into the flaps includes single-handedly grasping the handles to elastically and elastomerically deform the upright wall.

4. The method according to claim 1, wherein allowing the litter box to return to the open ended molded shape includes allowing a biasing force to return the litter box to the open ended molded shape.

5. The method according to claim 1, further including unhooking a scoop from a stowed condition on the litter box, scooping feces from the litter box and hooking the scoop in the stowed condition.

6. The method according to claim 1, including filling the litter box with litter.

7. The method according to claim 1, wherein pouring the litter out of the litter box includes pouring the litter out of the litter box via the spout defined in a peripheral edge delimiting a top of the open ended molded shape.

8. The method according to claim 1, wherein elastically deforming the upright wall of the litter box includes elastically deforming the flaps.

9. The method according to claim 1, wherein grasping the litter box to bring the pair of flaps of the litter box together includes bringing the pair of flaps into contact with one another.

10. The method according to claim 1, including manually filling the litter box with litter for collection of pet waste in the litter box.

11. A method for emptying litter and pet waste from a litter box, the litter box having been manually filled with litter to collect pet waste from a pet in the litter box, comprising:
- grasping the litter box by elastically deforming an upright wall of the litter box, the upright wall made of a flexible elastomeric material and defining a cavity of the litter box, to bring a pair of flaps of the litter box together from an open ended molded shape, a spout being defined by the upright wall at an edge of the litter box,
- pouring litter with pet waste out of the litter box via the spout formed by the upright wall during the grasping; and
- allowing the litter box to return to the open ended molded shape.

12. The method according to claim 11, wherein grasping the litter box includes grasping a pair of handles formed into the flaps by manipulation to elastically deform the upright wall.

13. The method according to claim 11, including manually filling the litter box with litter for collection of pet waste in the litter box.

14. A method for emptying litter and pet waste from a litter box, the litter box having been manually filled with litter to collect pet waste from a pet in the litter box, comprising:
- grasping the litter box by handles formed in a pair of flaps of a flexible elastomer upright wall of the litter box to elastically deform the flexible elastomer upright wall, the flexible elastomer upright wall defining a cavity of the litter box, to bring the pair of flaps together from an open ended molded shape, a flexible elastomer spout being defined by the flexible elastomer upright wall at an edge of the litter box, pouring litter with pet waste out of the litter box via the flexible elastomer spout during the grasping; and allowing the litter box to return to the open ended molded shape.

15. The method according to claim 14, including manually filling the litter box with litter for collection of pet waste in the litter box.

* * * * *